United States Patent Office 2,809,423
Patented Oct. 15, 1957

2,809,423

SALT FLUX AND METHOD FOR BRAZING ALUMINUM PARTS THEREWITH

Dean K. Hanink, Birmingham, Mich., assignor to General Motors Corporation, Detroit, Mich., a corporation of Delaware No Drawing. Application March 30, 1953,
Serial No. 345,679

4 Claims. (Cl. 29—501)

This invention relates to a brazing flux and more particularly to a salt flux for joining aluminum surfaces by a brazing operation.

Heretofore it has been exceedingly difficult to obtain a satisfactory bond between aluminum surfaces by brazing because of the inadequacy of the available salt fluxes. It is desirable to use a brazing flux which is chemically stable and which may be employed as a heating medium as well as for fluxing the aluminum surfaces to be joined together.

Accordingly, a principal object of the present invention is to provide a salt flux for brazing parts formed of aluminum, aluminum alloys, or aluminum coated surfaces of other non-ferrous or ferrous metal parts. A further object of this invention is to provide such a brazing flux which is chemically stable at elevated temperatures so that it may be also used in the form of a salt bath.

These and other objects are attained in accordance with my invention by a salt flux composition comprising sodium chloride, potassium chloride, barium chloride and cryolite. This salt flux not only possesses the aforementioned desirable properties, but it also has a melting point of approximately 1080° F. Such a low melting point is advantageous inasmuch as pure aluminum melts at approximately 1220° F., and aluminum alloys which may be used in sheet form between the aluminum surfaces to be joined together generally have melting points which are even slightly higher than that of pure aluminum. Hence it is normally undesirable to employ salt fluxes having melting points higher than about 1100° F.

Moreover, since aluminum brazing is normally done by a dipping operation, my salt flux is advantageous because it possesses a lower specific gravity than aluminum and aluminum base alloys. This salt mixture also maintains excellent fluxing or cleaning action on aluminum at temperatures between 1110° F. and 1150° F. Furthermore, my brazing flux possesses low volatility and good chemical stability, both of which are highly desirable in a fluxing medium. It should also be noted that this flux contains no lithium salt. This latter constituent is normally present in commercial brazing fluxes, and it is desirable to eliminate it if possible because of its scarcity and high cost.

Other objects and advantages of this invention will more fully appear from the following detailed description of a preferred composition of a salt flux in accordance with my invention and a method of using the same.

It will be understood that by "aluminum base alloy," as hereinafter used, it is meant those aluminum alloys, including pure aluminum, which in general contain at least 80% aluminum. Hence, it will also be understood that the terms "aluminum" and "aluminum base alloy," as used herein are interchangeable and are not intended to restrict any phases of the invention to only one of these groups.

In accordance with the present invention, a satisfactory bond between aluminum surfaces is provided by brazing with a flux comprising, by weight, approximately 15% to 20% sodium chloride, 20% to 30% potassium chloride, 30% to 48% barium chloride, 8% to 12% cryolite ($Na_3AlF_6$), and 2% to 10% aluminum fluoride. At present I prefer to use the following salt flux composition which appears to provide optimum results, the composition being in approximate percentages by weight: 16.8% sodium chloride, 21% potassium chloride, 46.1% barium chloride, 10.5% cryolite and 5.6% aluminum fluoride.

While in the foregoing examples the double salt $Na_3AlF_6$ (cryolite) is included in the bath, it should be understood that an equivalent amount of this component may be supplied in the form of the single salts, sodium fluoride and aluminum fluoride. However, I have found that it is essential to provide an excess of $AlF_3$ over that of the cryolite ratio in order to obtain the desired results.

The aluminum surfaces of the parts to be brazed are preferably cleaned in any suitable manner prior to the immersion in the fused salt bath. Where these surfaces have an excessive amount of oil thereon or are badly scaled, more consistent and uniform results may be obtained if mechanical cleaning means, such as grit blasting, sand blasting, hydroblasting or vapor blasting, is employed. Other suitable cleaning treatments, such as etching by appropriate fluxes, may be used if desired.

This preliminary cleaning treatment, although recommended as a preferred step in the procedure, is not necessary to obtain satisfactory results in most instances. Frequently no special preparation of the aluminum surfaces prior to immersion in the fused salt bath is necessary since the molten salt flux dissolves the metallic oxides which are present, and a small amount of oil will burn off with no deleterious effects. Of course, the parts to be joined should be dry to avoid a steam explosion when immersed in the molten salt.

A thin sheet of aluminum or aluminum alloy is then inserted between the parts which are to be brazed, and these parts and the interjacent brazing sheet are preferably securely clamped together in a fixture. Alternatively, they may be held in assembled position by any other suitable method, such as, for example, by "tacking," spot welding or other welding methods, crimping, staking, clamping, etc. The assembled parts, either with or without preheating are thereafter brazed together by immersing them in the above-described fused salt bath.

This molten brazing salt flux is maintained at a satisfactory temperature, preferably between 1100° F. and 1150° F., a flux temperature of approximately 1115° F. being highly satisfactory. The flux penetrates the joint gaps and the aluminum alloy sheet melts, filling the joints and filleting at the edge of joint locations. It is not necessary to melt the aluminum surfaces of the assembled parts during this brazing operation.

The cold parts, in passing into the salt bath, will become coated with a layer of the flux which may momentarily solidify, but the salt will remelt after sufficient time of contact with the immersed parts when the surfaces of the latter are raised to a temperature above the melting point of the salt. The time of immersion in the fused salt may vary from two or three seconds to several minutes, depending upon such factors as the sizes of the surfaces being joined and the complexity of the parts.

After the assembled parts have been removed from the brazing bath, they are permitted to cool in air while clamped in the fixture or otherwise suitably held together. The bonded assembly thus produced has sound and adequately filleted joints and the metal interface is not brittle. If a fixture is employed, it is preferably removed from the brazed assembly at room temperature.

The sheet which is interposed between the aluminum-surfaced parts may be pure aluminum or an aluminum base alloy preferably containing approximately 80% or more aluminum. An aluminum base alloy which is particularly advantageous is one composed of approximately 5% to 15% silicon and the balance aluminum. This alloy, which forms a eutectic at 12% silicon, has a relatively low melting temperature, making it especially appropriate for forming relatively non-brittle joints. Specific examples of other appropriate aluminum base alloys include an alloy composed of 4% copper and the balance aluminum, an alloy composed of approximately 7% tin or 7% silicon and 93% aluminum, and an alloy containing 5% to 20% zinc and the balance substantially all aluminum. These specific examples are referred to merely for purposes of illustration and not of limitation.

In some instances it appears that most effective fluxing action is provided if the fused salt bath is activated by aluminum or aluminum alloys in or in contact with the bath. This may be accomplished by employing an aluminum or aluminum alloy coated container for the fused salt, or aluminum or an aluminum alloy may be added to the salt. The aluminum or aluminum alloy may be added by immersing a bar or sheet of the metal in the fused salt bath. This bar or sheet of aluminum alloy readily melts and settles to the bottom of the bath.

While the procedure described in detail above constitutes a preferred method of brazing in accordance with my invention, it is possible to obtain a satisfactory composite article by departing from the conditions of the preferred embodiment. For example, if the parts to be joined have previously been coated with a brazing aluminum alloy having the proper low melting characteristics, it is sometimes possible to braze in the salt flux directly without the use of the intermediate aluminum or aluminum base alloy sheet between the parts to be joined.

Likewise, the aluminum-surfaced parts may be preheated, if desired, prior to assembly and the initial immersion in the fused salt bath, since this treatment permits the use of smaller quantities of salt and smaller size salt bath heating means than are necessary where the parts are heated entirely in the molten salt. An inert or reducing atmosphere furnace, such as one employing hydrogen, Drycolene, etc., may be used for this preheating step if the parts to be brazed are readily oxidizable. The term "Drycolene" is the trade name for a furnace atmosphere gas produced in a charcoal generator utilizing a hydrocarbon gas and air as a gas source. The air and hydrogen gas are passed through hot charcoal at approximately 1800° F. and transformed by chemical reaction with the charcoal to an atmosphere consisting of approximately 20% carbon monoxide, less than 2% hydrogen, less than 0.5% carbon dioxide and the balance nitrogen. The preheating temperature is preferably within the range of approximately 1000° F. to 1150° F.

When the parts are preheated, either before or after assembly, in a non-oxidizing atmosphere to the temperature of the fused salt bath and are free of metallic oxides and other foreign matter, the time of subsequent immersion in the salt flux in each instance may be as little as a few seconds. Where the parts have metallic oxides or other foreign matter on their surfaces, longer periods of immersion in the salt flux may be required. Of course, where the preheating step is not employed, sufficient time is required for the fused salt bath to heat the surfaces of the parts to a temperature at least as high as, and preferably somewhat above, the melting point of the salt. The exact time will, of course, depend on the dimensions of the parts and the size and thermal efficiency of the salt bath. Retaining the parts in the fused salt for extended periods of time has no detrimental effects on the resultant product.

As a specific example indicating the quality of the bond produced by the above-described process, brazed joints were formed between a pair of 1.75" x 0.50" x 0.055" strips of aluminum coated commercial titanium. The ends of these pieces were placed together to form a lap of ½ inch, and inasmuch as the strips were ½ inch wide, the area of contact was ¼ square inch. Shear tests on such ¼ square inch lap samples indicated that they do not fail until approximately 1575 pounds force is applied. The results of testing other strips in tension so that the joints were in shear showed that ¼ square inch and ⅜ square inch lap samples required more than 1900 pounds to break them in shear. Still other sample strips of brazed parts having joint area dimensions of 0.50" x 0.055" were tested and broke under tension loads between 2100 pounds and 2500 pounds. All of these tests demonstrated that the formed brazed joint possessed sufficiently strength to deform the base material before failure of the joint occurred.

Although the above salt flux composition is primarily designed and is used most successfully as a brazing medium for heating and fluxing aluminum, aluminum alloys or aluminum-surfaced parts formed of other non-ferrous or ferrous materials, this salt may also be used as a coating flux in some instances.

While the invention described herein has been described by means of certain specific examples, it will be understood that various changes and modifications of the embodiments of this invention may be made by those skilled in the art without departing from the principles and scope of my invention as set forth in the following claims.

I claim:

1. A salt flux for brazing metal surfaces containing at least 80% aluminum, said flux consisting essentially of, by weight, 15% to 20% sodium chloride, 20% to 30% potassium chloride, 30% to 48% barium chloride, 8% to 12% cryolite and 2% to 10% aluminum fluoride.

2. A brazing flux for joining surfaces containing at least 80% aluminum, said brazing flux consisting essentially, by weight, of approximately 16.8% sodium chloride, 21% potassium chloride, 46.1% barium chloride, 10.5% cryolite and 5.6% aluminum fluoride.

3. A method of brazing parts having metallic surfaces selected from the class consisting of aluminum and aluminum base alloys which comprises assembling a thin sheet formed of a member consisting of aluminum and aluminum base alloys between the surfaces of said parts and, while so assembled, immersing said parts and sheet in a fused salt bath maintained at a temperature between 1110° F. and 1150° F., said salt bath consisting essentially of, by weight, 15% to 20% sodium chloride, 20% to 30% potassium chloride, 30% to 48% barium chloride, 8% to 12% cryolite and 2% to 10% aluminum fluoride.

4. A process for joining parts having surfaces containing at least 80% aluminum by a brazing operation, said process comprising interposing a thin metal sheet containing at least 80% aluminum between said surfaces, maintaining said parts and interjacent sheet in assembled position and, while so assembled, immersing said parts and sheet for at least two seconds in a fused salt bath having a temperature between 1110° F. and 1150° F., said salt bath consisting essentially of approximately 15% to 20% by weight of sodium chloride, 20% to 30% by weight of potassium chloride, 30% to 48% by weight of barium chloride, 8% to 12% by weight of cryolite and 2% to 10% by weight of aluminum fluoride.

References Cited in the file of this patent

UNITED STATES PATENTS

| Number | Name | Date |
|---|---|---|
| 1,968,984 | Binder | Aug. 7, 1934 |
| 2,101,553 | Mattsson | Dec. 7, 1937 |
| 2,258,681 | Hoglund | Oct. 14, 1941 |
| 2,299,166 | Miller | Oct. 20, 1942 |
| 2,327,065 | Reimers | Aug. 17, 1943 |
| 2,396,604 | Reimers | Mar. 12, 1946 |
| 2,403,109 | Miller | July 2, 1946 |
| 2,417,662 | Rosales | Mar. 8, 1947 |
| 2,443,574 | Burns | June 15, 1948 |
| 2,497,539 | Emley | Feb. 14, 1950 |
| 2,498,199 | Block | Feb. 21, 1950 |
| 2,544,670 | Grange et al. | Mar. 13, 1951 |
| 2,569,097 | Grange et al. | Sept. 25, 1951 |